United States Patent
Van Soest et al.

(10) Patent No.: US 6,340,527 B1
(45) Date of Patent: Jan. 22, 2002

(54) ENCAPSULATION OF ACTIVE INGREDIENTS

(75) Inventors: Jeroen Johannes Gerardus Van Soest; Renée Josie Gide Van Schijndel, both of Wageningen; Kornelis Fester Gotlieb, Assen, all of (NL)

(73) Assignee: ATO B.V., Wageningen (NL)

( * ) Notice: Subject to any disclaimer, the term of this patent is extended or adjusted under 35 U.S.C. 154(b) by 0 days.

(21) Appl. No.: 09/462,176

(22) PCT Filed: Jul. 1, 1998

(86) PCT No.: PCT/NL98/00377

§ 371 Date: Jan. 3, 2000

§ 102(e) Date: Jan. 3, 2000

(87) PCT Pub. No.: WO99/01214

PCT Pub. Date: Jan. 14, 1999

(30) Foreign Application Priority Data

Jul. 1, 1997 (NL) .............................................. 1006444

(51) Int. Cl.⁷ .............................. B32B 15/02; C08L 5/00

(52) U.S. Cl. .............................. 428/402.2; 428/402.24; 428/407; 524/27; 524/47; 524/801

(58) Field of Search .......................... 428/402.2, 402.24, 428/407; 524/801, 27, 47

(56) References Cited

FOREIGN PATENT DOCUMENTS

| WO | WO 89/03674 | * | 5/1989 |
|----|-------------|---|--------|
| WO | WO 94/07597 |   | 4/1994 |

* cited by examiner

*Primary Examiner*—Samuel A. Acquah
(74) *Attorney, Agent, or Firm*—Young & Thompson

(57) ABSTRACT

Microspheres having a particle size of 50 nm to 1 nm and a polydispersity of less than 40%, consisting of a chemically cross-linked starch shell containing an active ingredient, are obtained by preparing an oil-in-water emulsion of the active ingredient in a hydrophobic phase and starch or a dispersion of a solid active ingredient and starch in water, incorporating the oil-in-water emulsion or solid dispersion in an outer hydrophobic phase, particles of the oil-in-water emulsion or solid dispersion being formed in the outer hydrophobic phase, cross-linking the starch or derivative thereof and removing the outer hydrophobic phase if desired.

15 Claims, No Drawings

ENCAPSULATION OF ACTIVE INGREDIENTS

The invention relates to a process for the preparation of microparticles which contain an active ingredient in a starch shell.

A process of this type is disclosed in WO 89/03674. According to this known process, microspheres are prepared by suspending an active ingredient, such as paramagnetic particles, in a starch solution, cross-linking the starch with a phosphate and then emulsifying the starch, before or after cross-linking, in a hydrophobic medium.

WO 93/02712 discloses a process for the preparation of microspheres according to which an oil-in-water emulsion of a soluble starch fraction and, for example, dichloromethane is prepared, after which a dehydrating agent, such as an alcohol, is added. The particles are fixed by retrogradation of the starch, which therefore must have a high amylose content.

WO 94/07597 discloses a process for encapsulating an oil phase in a polymeric material that can be cross-linked. The polymeric material is a water-soluble polymer such as polyvinyl alcohol dissolved in water (e.g. at 10%). Acrylamide polymers, soluble cellulose, starch and other polysaccharide derivatives are mentioned as alternatives, but the document does dot contain any guidance or illustration on the utility of such soluble polysaccharides. Moreover, solutions put limitations e.g. to the molecular weight and concentration of the polymer.

A process has now been found which leads to convenient particles in which an active ingredient is encapsulated, which active ingredient is released only under specific chosen conditions or after a relatively long period. The process is characterised by the features in the appended claims.

A fine distribution of the active ingredient can be a dispersion of a solid water-insoluble active ingredient or an emulsion of a hydrophobic active ingredient (optionally dissolved in a hydrophobic phase such as an oil). The fine distribution (dispersion or emulsion) is a distribution in an aqueous dispersion of starch or derivative thereof comprising at least 25% starch. Examples of water-insoluble solid active ingredients comprise pigments such as titanium dioxide or zinc oxide, paramagnetic materials such as magnetite, nickel or cobalt, fluorescent materials and the like. The particles size of the solid active ingredient can be in the range of e.g. 10 nm to 50 $\mu$m. In the further specification, the distribution of the active ingredient is illustrated with reference to the oil-in water emulsion; however, the same applies to the solid-in-water dispersion by substituting the oil by the solid active ingredient.

An important constituent of the microparticles is starch, which has the advantage of being able to encase a multiplicity of active ingredients and of being biodegradable. Suitable starches are native starch and fractions and derivatives thereof. Preferably, the starch is granular starch, which can be native or modified native starch and is not water-soluble.

Granular starch is starch having a granular shape similar to the shapes which occur in native starch. Granular starch can have various shapes and sizes (usually in the range of 0.5–175 microns) characteristic of its native source. In most cases, birefringence is seen with polarised light microscopy. Granular starch is usually semi-crystalline. It is not soluble in cold water without the use of chemicals. Granular starch is swellable to a limited extent only. The water uptake is limited (less than 5 times its own weight). As granular starch is also considered chemically or physically modified starch of which most of the original shape and size is maintained during modification. Suitable derivatives are oxidised starch (carboxy starch, dialdehyde starch), carboxyalkylated starch, sulphated or phosphated starch, cationic starch and the like. These modified granular starches usually show still birefringence, but the crystalline nature can be significantly reduced. The modified granular starches do not form gels in cold water without the addition of chemicals. All granular starches show a characteristic gelatinisation endotherm with DSC or an increase in viscosity during heating in water.

The use of granular starches has some advantages over the use of soluble starches. A higher starch concentration can be used, or starch with a higher molecular weight. Thus, a shell can be prepared that has a higher network density, which may be advantageous for the release properties. Another advantage of using granular starch is that various types of starch can be used, such as high-amylose starch, which cannot be used in solution because of rapid retrogradation. Also, the degree of gelatinisation can be controlled through temperature control or adjustment of the amount of alkaline solution added; the degree of gelatinisation allows for adjustment of the network structure; if desired, particles with residual granular structure can be obtained. When the starch is not completely gelatinised, remainders of granular structures will be present. Such granular structures can be observed using (polarised) light microscopy or scanning electron microscopy. Via this route, the swelling behaviour and the release properties of the particles can be adjusted. For example, the release in the gastrointestinal tract may be spread or delayed as a result of the presence of granular structures.

The starch concentration in the aqueous phase before formation of a fine distribution can be e.g. from 5 to 50% by weight, preferably from 15 to 40% by weight, with respect to the water volume. The initial molecular weight of the starch is advantageously above 200,000, especially above 500,000.

It is possible to use a mixture of various types of starch. For instance, partially soluble starch can be added to native starch. Suitable starch fractions are, for example, starch enriched in amylose or specifically in amylopectin. In order to optimise the properties of the particles an auxiliary substance can be added to the starch suspension that modifies the viscosity of the suspension, at a level of 0 to 75 wt. % of the total amount of carbohydrates, preferably 0 to 50 wt. %, more preferably 1 to 25 wt %, in particular 2 to 10 wt. %. This auxiliary substance can be a water-soluble carbohydrate, such as cold water soluble starch, modified starch, cellulosic derivatives such as carboxymethyl cellulose, alginates, pectines and the like.

The oil-in-water emulsion can be prepared in a manner known per se by adding an oil or another hydrophobic substance to the aqueous solution or dispersion of starch. Suitable oils or hydrophobic substances are all water-immiscible liquids, such as hydrocarbons (alkanes, cycloalkanes), ethers, esters, halogenated hydrocarbons and oils. If the active ingredient is also hydrophobic, it can advantageously be added via the oil. The emulsion is formed by adding the hydrophobic phase to the suspension of starch in water. Preferably a soap or another surfactant, which promotes the formation of an oil-in-water emulsion, is added to the aqueous phase before the hydrophobic phase is added. The amount of surfactant is preferably between 0.25 and 5 wt. % with respect to the water volume. Following the addition, a stable emulsion is formed by employing adequate mechanical forces. In this context stable is understood to be stable for the duration of the process. Equipment which can be used for this process is, for example, a top stirrer, an Ultra-Turrax®, a homogeniser or any other suitable emulsion-forming equipment. The dispersion of solid active ingredient can be prepared in the same manner.

After a stable oil-in-water emulsion has been obtained, a particulate material is prepared therefrom by dispersing the emulsion in a hydrophobic phase. The hydrophobic phase can be formed by a water-immiscible solvent, such as an alkane, cycloalkane, ether, ester, halogenated hydrocarbon and the like, or an oil. An oil-in-water-in-oil (o/w/o) emulsion is thus obtained. The conditions for emulsion formation can be the same as those for the formation of the first o/w emulsion. During this stage it is also possible to add, to the second hydrophobic phase, a soap or another surfactant which promotes the formation of a water-in-oil emulsion. Similarly a solid-in-water-in-oil emulsion is obtained from the solid dipersion and the hydrophobic phase.

Cross-linking takes place after the emulsion or dispersion has been dispersed in a hydrophobic substance. When granular starch is used, the starch is simultaneously completely or partially gelatinised and cross-linked after emulsification. During preparation of the oil-in-water-in-oil (or solid-in-water-in-oil) emulsions, the integrity of the granular starch or cold water insoluble starch is kept intact. After the formation of the emulsion, preferably during crosslinking, the granular integrity can be changed by gelatinisation as a result of an increase in temperature or an addition of alkaline or acid or other chemicals. Preferably the granular shape is at least partially maintained, so that residual granules or remnants or partially gelatinised starch arc present in the particles.

Cross-linking can be effected by means of a cross-linking agent, which preferably is added beforehand to the starch solution/dispersion. Cross-linking can be initiated at the desired point in time, preferably after the formation of particles in the suspension or emulsion has taken place, by adding a catalyst, for example a base, a salt or an acid, depending on the type of cross-linking reaction. Cross-linking can also optionally be initiated by raising the temperature. The cross-linking agent used can be a conventional cross-linking agent, such as a diamine, a dialdehyde, an epoxide such as epichlorohydrin, a trimetaphosphate, phosphoryl chloride or an anhydride of a dibasic or polybasic carboxylic acid. The use of a phosphate, such as trisodium trimetaphosphate (TSTP), as cross-linking agent is particularly preferred. In these cases the catalyst can be a base, such as sodium hydroxide. Per anhydroglucose unit, 20 to 500 mmol cross-linking agent per mol anhydroglucose units is preferably used. The quantity to be used is partly dependent on the active ingredient and on the desired rate of release.

In the case of dialdehyde starch, the cross-linking agent can, for example, be a diamine, such as urea, tetramethylenediamine or hexamethylenediamine, it being possible to use an acid as catalyst. In the case of, for example, carboxymethyl starch or dicarboxy starch, a diamine or a diol can also be used for cross-linking. In this case, however, cross-linking can also, and advantageously, be achieved by internal esterification, which can be catalysed by a polyvalent metal ion, such as calcium, magnesium, aluminium, zinc or iron, preferably calcium. Another possible starting material is cationic (aminoalkyl) starch, which can be cross-linked in situ using a dicarboxylic acid or a dialdehyde.

The particle size of the microparticles according to the invention is preferably between 50 nm and 1 mm. The particles are usually spherical and are virtually monodisperse. The polydispersity is at most 40%, in particular less than 30%. Active ingredients that can be used are, for example, perfumes, flavours, colorants, medicaments (for example hormones, anti-inflammatory agents, insulin, chemotherapeutic agents), vaccines, vitamins (for example A and D), nutrients, such as polyunsaturated fats and fatty acids (fish oil), proteins and peptides, fertilisers, pesticides (for example atachlor), reagents or catalysts for chemical reactions, coatings, paints, ink, diagnostic agents, etc.

The degree of loading of the microparticles is partly dependent on the hydrophobic phase of the first (o/w) emulsion. If the active ingredient itself is the hydrophobic substance, that is to say, without a hydrophobic excipient, the loading is in general between 0 and 60% by weight of the total weight of the starch (solids), in particular between 5 and 25% by weight. If the active ingredient is dissolved in the hydrophobic phase, the loading is between 0 and 20% by weight, in particular between 2 and 10% by weight, depending on the solubility.

The active ingredient can be released in a target environment by chemical, enzymatic or physical modification or degradation of the starch shell. For instance, the active ingredient can be released in the digestive tract under the influence of the different conditions (pH, amylases); the sensitivity to a particular pH or to a particular enzyme can optionally be increased or reduced by modification of the starch used as starting material. In detergents, for example, release can be promoted by raising the temperature or by pH or enzyme effects. In land for cultivation or potting compost, release can be effected by hydrolysis or the action of salts. In reaction mixtures release can also be effected, for example, under the influence of electric current or a change in pH.

The microparticles can be used in detergents, fertilisers, foods, flavourings, pharmaceutical agents, tissues, cosmetics, soil improvers, pesticides (fungicides, bactericides, insecticides, acaricides, nematicides, and the like), coatings, paints, ink, organic reactants (hydrogen peroxide), catalysis and diagnostic agents. The quantities to be used are the quantities customary for the application concerned.

EXAMPLE 1

A suspension of 20 g PN (native potato starch) in 200 ml water in which 5 ml Tween® 80 had been dissolved was prepared. 2 g TSTP (trisodium trimetaphosphate) was then dissolved in this suspension. 20 ml salad oil was then added and an emulsion was formed with the aid of an Ultra-Turrax®. The o/w emulsion was then emulsified in a second hydrophobic phase, namely 400 ml peanut oil. A top stirrer at a stirrer speed of 800 rpm was used for this purpose. A solution of 5 g NaOH in 50 ml water was added to the solution with stirring, in order to initiate cross-linking. After 4 hours the emulsion was broken by adding acetic acid. The starch particles collected in the water/acetic acid phase. After separation, the particles were washed a few times with demincralised water and this was followed by washing with ethanol and air-drying.

EXAMPLE 2

10 g Flocgel® LV-W was dissolved in 200 g water in which 5 ml Tween® 80 had been dissolved. 10 g PN and 2 g TSTP were added to the solution. 20 ml salad oil was added to the slurry, after which an emulsion was formed with the aid of an Ultra-Turrax®. The emulsion was added to 400 ml peanut oil and the secondary emulsion was formed using a top stirrer. A solution of 5 g NaOH in 50 ml water was added, whilst stirring, to initiate cross-linking. After 18 hours the emulsion was broken with acetic acid. The starch particles collected in the water/acetic acid phase. After separation, the particles were washed a few times with demineralised water and this was followed by washing with ethanol and air-drying.

EXAMPLE 3

Twenty grams of PN were added to 200 ml water in which 5 g Tween® 80 was dissolved. Four g TSTP was dissolved in this suspension, followed by the addition of 20 g of salad oil. An emulsion was formed with the aid of an Ultra-Turrax®. The o/w emulsion was then emulsified in a second hydrophobic phase, namely 400 ml of paraffin oil. A top stirrer at a stirrer speed of 1400 rpm was used for this purpose. A solution of 1.2 g NaOH in 10 ml water was subsequently added to the emulsion with stirring, in order to initiate partial gelatinisation and cross-linking. The concentration was chosen such that complete gelatinisation is prevented. After 4 hours the emulsion was broken by addition of acetic acid. The starch particles collected in the water/acetic acid phase. After separation, the particles were washed with demineralised water and kept as a dispersion. Light microscopy showed particles containing oil, in which residual granular structures were clearly visible.

EXAMPLE 4

Fifteen grams of PN were added to 100 ml water in which 2.5 g Tween® 80 was dissolved. Four g TSTP was dissolved in this suspension, followed by the addition of 20 g of salad oil. An emulsion was formed with the aid of an Ultra-Turrax®. The o/w emulsion was then emulsified in a second hydrophobic phase, namely 200 ml of paraffin oil. A top stirrer at a speed of 600 rpm was used for this purpose. A solution of 0.65 g NaOH in 10 ml water was subsequently added to the emulsion with stirring, in order to initiate partial gelatinisation and cross-linking. After 30 minutes, the stirrer speed was increased to 1000 rpm. After 4 hours the emulsion was broken by addition of acetic acid. The starch particles collected in the water/acetic acid phase. After separation, the particles were washed with demineralised water and kept as a dispersion. Light microscopy showed essentially monodisperse particles with a size of 25 $\mu$m containing droplets of oil.

What is claimed is:

1. A process for preparing microparticles which contain an active ingredient in a starch shell, characterised by preparing a fine dispersion of the active ingredient and starch or a derivative thereof in water, comprising at least 25% of granular starch, taking up said distribution in a hydrophobic phase, particles of the distribution being formed in the hydrophobic phase, cross-linking the starch or derivative thereof and, if desired, removing the hydrophobic phase, the starch remaining granular throughout the process.

2. A process according to claim 1, wherein said fine distribution of the active ingredient and starch in water is an oil-in-water emulsion.

3. A process according to claim 1, wherein the active ingredient is a medicament, fat component, peptide, pesticide, organic reactant, paramagnetic substance, catalyst, colorant, perfume, flavour or nutrient.

4. A process according to claim 1, wherein a water-soluble carbohydrate is added to the starch before preparing said oil-in-water emulsion in an amount of 0–50%, by weight with respect to the total of said starch and said water-soluble carbohydrate.

5. A process according to claim 1, wherein a cross-linking agent is added to the starch before the preparation of the oil-in-water emulsion.

6. A process according to claim 5, wherein the cross-linking agent is a diamine, a dialdehyde, an epoxide or, a trimetaphosphate.

7. A process according to claim 5, wherein cross-linking is started by adding a cross-linking catalyst.

8. A process according to claim 1, wherein the starch derivative is a carboxyalkyl starch and cross-linking is carried out by adding a polyvalent metal ion.

9. A process according to claim 1, wherein said starch has an average molecular weight of more than 200,000.

10. A process according to claim 1, wherein a surfactant is added to the starch.

11. Microparticles having a particle size of 50 nm to 1 mm and a polydispersity of less than 40%, consisting of a chemically cross-linked starch shell containing a hydrophobic phase containing active ingredient, the microparticles being obtained using the process according to claim 1.

12. Microparticles according to claim 11, in which the starch is partially gelatinised and granular structures are still present in the shell.

13. Microparticles according to claim 11, in admixture with a diluent.

14. A process according to claim 1, wherein said active ingredient is water-insoluble.

15. A process according to claim 1, wherein said active ingredient is hydrophobic.

* * * * *